(No Model.)
C. FRANCIS.
TOOL HOLDER.
No. 375,059. Patented Dec. 20, 1887.
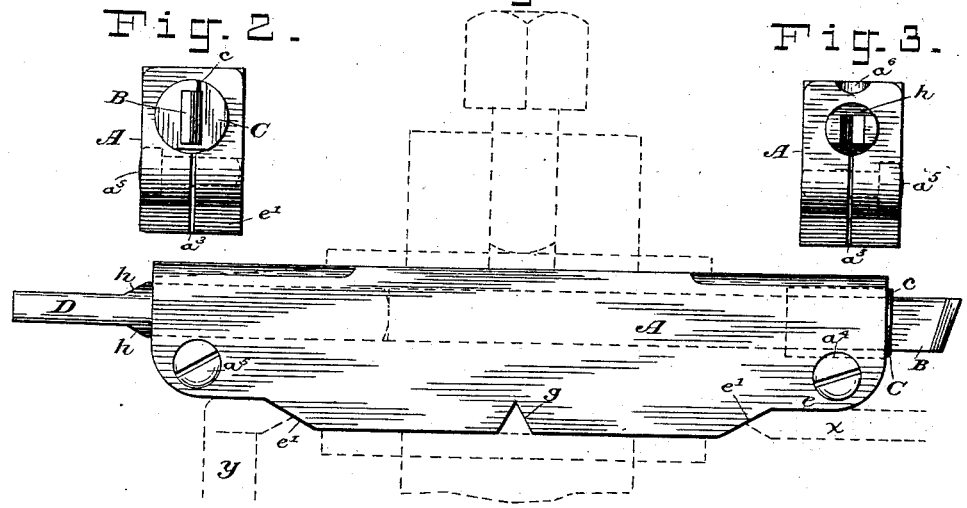
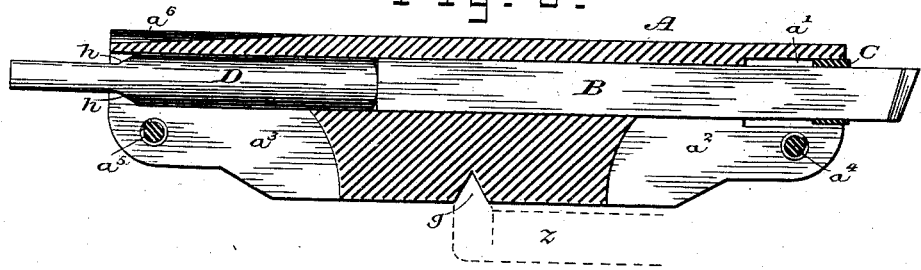
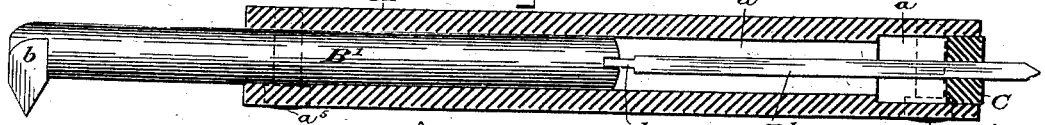
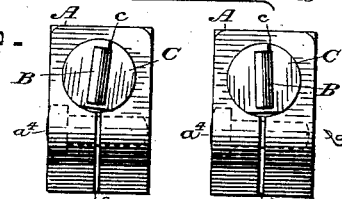
WITNESSES:
INVENTOR:
Charles Francis
By Henry Connett
Attorney.

UNITED STATES PATENT OFFICE.

CHARLES FRANCIS, OF NEW BRUNSWICK, NEW JERSEY.

TOOL-HOLDER.

SPECIFICATION forming part of Letters Patent No. 375,059, dated December 20, 1887.

Application filed April 13, 1887. Serial No. 234,583. (No model.)

*To all whom it may concern:*

Be it known that I, CHARLES FRANCIS, a citizen of the United States, and a resident of New Brunswick, in the county of Middlesex and State of New Jersey, have invented certain Improvements in Tool-Holders, of which the following is a specification.

My invention relates to that class of tool-holders which have a body or stock to be secured in the tool-post of a lathe, and in which stock the tool is adjustably secured; and the main object of my invention is to provide a stock that will properly and securely hold a tool made from a plain flat or round bar of steel and allow said tool to be set and adjusted to suit the particular work it is to perform.

Another object of my invention is to provide the holder with a thread-gage, whereby the point or cutter of the tool may be properly gaged when shaped to cut a V-shaped screw-thread of the exact size required.

My invention will be fully described hereinafter, and its novel features carefully defined in the claims.

In the drawings, which serve to illustrate my invention, Figure 1 is a side elevation of my improved tool-holder, the tool-post in which the holder is secured being shown in dotted lines. Fig. 2 is a front end view of the holder as seen in Fig. 1, and Fig. 3 is a rear end view of the same. Fig. 4 is an under side plan view. Fig. 5 is a vertical longitudinal mid-section of the holder, the tool and back-stop being in elevation. Fig. 6 represents two front end views of the holder similar to Fig. 2. These views are designed to illustrate the capability of the holder with respect to rotation of the tool in the holder in order to give the cutting end or cutter of the tool the proper "rake" in cutting either right or left hand screw-threads. Fig. 7 is a horizontal longitudinal section of the stock or body of the holder in the plane of the tool. This view shows the holder when used with a tool for cutting female screws.

A represents the body or stock of the holder, made of metal, and usually rectangular in cross-section.

B represents the tool secured in the holder, and, as herein shown, shaped to cut a V-thread. This tool is made from a flat rectangular bar of steel of the proper width and thickness, and requires no forging. In constructing the holder A, I bore through it lengthwise a hole, $a$, (seen clearly in Fig. 7,) and at one end of the holder I make a counterbore, $a'$, of larger diameter than the bore $a$. The bore $a$ should have a diameter of the proper measure to receive and snugly, but not tightly, fit the tool B and form a guide therefor.

C is a clamping-bush which is circular exteriorly and fits snugly into the counterbore $a'$. This bush has a rectangular aperture in it, through which tool B passes, and a slit, $c$, through it from its periphery into the said aperture. In the holder A are two slits, $a^2$ $a^3$, at its ends, extending from its lower face into the bores $a$ $a'$, and through said holder pass transversely two clamping-screws, $a^4$ $a^5$.

The manner of using my holder is as follows: The tool B is slipped through the bush C, and the two are then placed in the holder, as represented, and the clamping-screw $a^4$ driven in. This causes the holder to clamp tightly onto the bush C, and the bush in turn to clamp onto the tool B and hold it fast. To prevent the tool from being driven endwise into the holder, I place behind it in the bore $a$ a stop-pin, D, which is inserted at the rear end of the bore, and I clamp this pin fast by driving in screw $a^5$. In order to thin the metal at the top of the holder above the screw $a^5$, and thus enable the jaws of the holder to yield and clamp properly, I prefer to form a groove or flute, $a^6$, in the upper face of the holder, as clearly seen in Figs. 3 and 5. At the other or front end of the holder the counterbore $a'$, if extended deep enough, will serve to thin the metal properly at this end. However, this counterbore need only be deep enough to receive the bush C, and the thinning of the metal of the holder may be effected by other means than the deepening of the counterbore.

In cutting screw-threads it is necessary or customary to give the tool a little rake, so that it will follow the pitch or spiral of the screw without binding. This rake I impart by turning the tool a little on its axis, the bush C rotating in the counterbore $a'$. This adjustment of the tool is illustrated in Fig. 6.

Where a tool with a round or cylindrical shank is required—as, for example, in a tool, B', for cutting internal or female screws—I choose a round steel bar for the tool that will fit snugly into the bore $a$ of the holder and form the cutter $b$ to stand at right angles to the shank on the end of this by forging. Fig. 7 illustrates the manner of fixing such a tool in the holder. The round shank of the tool B' is slipped into bore $a$ at the rear end of the holder and clamped fast by driving in screw $a^5$. Then, to prevent the tool from turning axially in the holder, a flat stop-pin, D', is inserted in the other or front end of the holder through bush C, and its end $d$ is made to engage a nick in the butt of the tool-shank, as clearly shown in Fig. 7. Clamping-screw $a^4$ is then driven in and said stop-pin D' clamped fast.

The stop-pin D' may be a tool like tool B, and I have so represented it in Fig. 7; and a round-shanked tool like tool B' may be used as a stop-pin in place of the pin D seen in Fig. 5. Thus each tool may serve a double purpose. It is not necessary to thin down the end $d$ of stop-pin D', as seen in Fig. 7. It is only necessary that it should be of such thickness as to enter the nick in the shank of tool B'.

I have called the end of the holder at the right in Figs. 1, 4, and 5 the "front" end; but it will be observed that when the tool is inserted in the opposite end, as seen in Fig. 7, that end will become the front end or the working end.

In shaping a tool for cutting screws with V-threads it is important that a thread-gage be employed, and it is important, also, that the gage shall be convenient for use when wanted. The ordinary gages are apt to be mislaid and not readily found when needed, and they are usually so defective in this respect that they merely give the proper angle for the cutting-edge of the tool, but do not regulate the angle the oblique faces of the cutting-eges make with the parallel faces of the tool-shank. The reason of this is that in most cases such tools are forged, and the oblique faces of the cutting-edge have only approximate reference or relation to the faces of the tool-shank.

I make my tools B of steel bars of rectangular cross-section, and the opposite faces of these bars are parallel. Consequently in forming a V-shaped cutter—say, with an angle of sixty degrees—the oblique faces of the cutter will stand at an angle of thirty degrees with the faces of the tool-shank.

In providing my holder with a thread-gage I form on the lower face of the holder at one end (or both ends) a flat face, $e$, and a bevel or inclined face, $e'$, giving this latter the proper angle with face $e$. In the present case it is about thirty degrees. The manner of applying the tool to the gage is shown in Fig. 1, $x$ representing the tool B in dotted lines. The holder in Figs. 1, 4, and 5 is shown with a gage of this kind at each end; but this is not essential.

At $y$ in Fig. 1 is shown the tool B' in dotted lines, illustrating the manner of applying such a tool to the gage, in order that the oblique faces of the cutter may stand properly with respect to the axis of the tool. Owing to the shape of tool B', only one of its oblique faces can be applied to the gage I have described. Therefore I form a V-gage, $g$, in the lower face of the holder, and apply the cutter of tool B' to this gage, as seen at $z$ in Fig. 5, where tool B' is represented in dotted lines.

I may also form a thread-gage like that at $e\ e'$ on the stop-pin D, as seen at $h$. The drawings represent two gages formed on the pin D. This, however, is not required unless it is desired to employ tools having different bevels or inclines at their cutting ends. For example, the American custom is to give a V-thread an angle of sixty degrees, while in England custom requires that it shall be fifty-five degrees. My holder can be provided with thread-gages to suit both countries.

As all the tools B capable of being used in the holder will not be made from steel bars of the same thickness, I may and do use bushes C, having apertures in them of different widths, to better fit the bodies of the different tools. I may also use a thin-bodied tool with a bush having a wide aperture by inserting a suitable wedge or slip of metal through the aperture alongside of the tool. To render the bush C more readily compressible, I prefer to flatten it off at the side opposite slit $c$, so as to thin the metal at that point.

Tools for turning, as well as screw-cutting, may of course be used in my holder. The advantage of being enabled to construct the tools from steel bars having rectangular cross-sections, and without forging, is as important in respect to turning-tools as to those designed for cutting square and V-shaped screw-threads. Where the holder has a dovetail groove to receive the tool, as in some clamping-holders, the rectangular bar from which the tool is made must have its edges beveled throughout its entire length to fit said groove. I avoid this in my construction.

Having thus described my invention, I claim—

1. The tool holder or stock A, having a bore, $a$, a counterbore, $a'$, a slit, $a^2$, and a clamping-screw, $a^4$, in combination with the bush C, of the proper size to fit into said counterbore $a'$, and having an aperture for the passage of the tool and a slit, $c$, substantially as set forth.

2. The combination of a tool-holder, A, having a longitudinal cylindrical bore, $a$, a cylindrical counterbore, $a'$, a slit, $a^2$, and a clamping-screw, $a^4$, with a circular bush, C, fitting into said counterbore $a'$, and having an oblong rectangular aperture to receive the tool and a slit, $c$, to permit the bush to clamp on the tool, the diameter of the bore $a$ being equal to the longest dimension of the aperture in the bush.

3. The tool holder or stock A, having a bore, $a$, a counterbore, $a'$, slits $a^2$ and $a^3$, and clamping-screws $a^4$ and $a^5$, in combination with the bush C, made to fit into said counterbore $a'$, and having a rectangular aperture for the passage of the tool and a slit, $c$, substantially as set forth.

4. The combination of the tool holder or stock A, having a bore, counterbore, slits, and clamping-screws, substantially as described, the bush C, having an aperture for the passage of the tool and a slit to permit of its clamping on the body of the tool, and the back-stop to prevent the tool from being pushed back into the holder.

5. The combination, with the tool-holder A, having a bore, $a$, a counterbore, $a'$, slits $a^2\ a^3$, and clamping-screws $a^4\ a^5$, arranged as shown, of a clamping-bush, C, as described, constructed to fit in the counterbore $a'$, a tool with a cylindrical shank fitting the bore $a$ and provided with a nick in its butt, and a flat bar forming a back-stop for said tool clamped in the bush C and its end or butt $d$ engaging the nick in the tool-shank, substantially as set forth.

6. The tool-holder A, having a thread-gage formed on its lower edge or face at $e\ e'$, substantially as set forth.

7. The tool-holder A, having a V-shaped thread-gage, $g$, formed in its lower edge or face, substantially as set forth.

8. The back-stop D, provided with a thread-gage, $h$, as set forth.

In witness whereof I have hereunto signed my name in the presence of two subscribing witnesses.

CHARLES FRANCIS.

Witnesses:
HENRY CONNETT,
T. D. CAPLINGER.